(12) United States Patent
Nakamura et al.

(10) Patent No.: US 10,323,715 B2
(45) Date of Patent: Jun. 18, 2019

(54) TORSIONAL VIBRATION DAMPER

(71) Applicant: TOYOTA JIDOSHA KABUSHIKI KAISHA, Toyota-shi, Aichi-ken (JP)

(72) Inventors: Taiki Nakamura, Susono (JP); Shuhei Horita, Numazu (JP); Fusahiro Tsukano, Susono (JP); Morihiro Matsumoto, Susono (JP); Hiroyuki Amano, Susono (JP); Yuya Takahashi, Susono (JP); Tadashi Sekiguchi, Kanagawa-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 60 days.

(21) Appl. No.: 15/484,723

(22) Filed: Apr. 11, 2017

(65) Prior Publication Data

US 2017/0299016 A1    Oct. 19, 2017

(30) Foreign Application Priority Data

Apr. 13, 2016  (JP) ................................ 2016-079981

(51) Int. Cl.
*F16F 15/14*  (2006.01)
*F16H 45/02*  (2006.01)
*F16H 1/28*   (2006.01)

(52) U.S. Cl.
CPC ....... *F16F 15/1478* (2013.01); *F16H 1/2863* (2013.01)

(58) Field of Classification Search
CPC ...... F16H 2045/0221; F16H 2045/0268; F16F 15/1206; F16F 15/13157; F16F 15/1478
See application file for complete search history.

(56) References Cited

U.S. PATENT DOCUMENTS

| 4,382,393 A | * | 5/1983 | Bowen | F16H 47/085 |
| | | | | 475/47 |
| 2002/0117860 A1 | * | 8/2002 | Man | B60K 6/365 |
| | | | | 290/46 |
| 2013/0213761 A1 | * | 8/2013 | Franke | F16F 15/1206 |
| | | | | 192/30 V |
| 2014/0047949 A1 | * | 2/2014 | Lorenz | F16F 15/13157 |
| | | | | 74/664 |
| 2015/0377321 A1 | * | 12/2015 | Dieckhoff | F16F 15/13157 |
| | | | | 475/35 |
| 2017/0227093 A1 | * | 8/2017 | Matsumoto | F16H 1/2863 |

FOREIGN PATENT DOCUMENTS

| JP | 2008164013 A  | 7/2008 |
| JP | 2008-267486 A | 11/2008 |

* cited by examiner

*Primary Examiner* — Tisha D Lewis
(74) *Attorney, Agent, or Firm* — Hunton Andrews Kurth LLP

(57) ABSTRACT

A torsional vibration damper in which noise and vibrations in a planetary gear unit are suppressed is provided. In a planetary gear unit, as an inertial element is oscillated to establish an inertial torque by a relative rotation between a sun gear and a ring gear. Pinion gears are interposed between the sun gear and the ring gear at predetermined intervals, and gear dimensions of one of the pinion gears and gear dimensions of another one of the pinion gears are different from each other.

4 Claims, 4 Drawing Sheets

| | Number of Teeth | | | Module |
|---|---|---|---|---|
| | Sun Gear | Pinion Gear | Ring Gear | |
| 1st Segment | a | a | 3a | m |
| 2nd Segment | b | b | 3b | $\frac{4}{5}m$ |
| 3rd Segment | c | c | 3c | $\frac{2}{3}m$ |
| 4th Segment | d | d | 3d | $\frac{8}{9}m$ |

|  | Number of Teeth | | | Module |
|---|---|---|---|---|
|  | Sun Gear | Pinion Gear | Ring Gear |  |
| 1st Segment | a | a | 3a | m |
| 2nd Segment | b | b | 3b | m |
| 3rd Segment | c | c | 3c | m |
| 4th Segment | d | d | 3d | m |

Fig. 6

|  | Number of Teeth ||| Working Pressure Angle |
|  | Sun Gear | Pinion Gear | Ring Gear |  |
| --- | --- | --- | --- | --- |
| 1st Segment | a | a | 3a | e |
| 2nd Segment | a | a | 3a | f |
| 3rd Segment | a | a | 3a | g |
| 4th Segment | a | a | 3a | h |

TORSIONAL VIBRATION DAMPER

CROSS-REFERENCE TO RELATED APPLICATIONS

The present invention claims the benefit of Japanese Patent Application No. 2016-079981 filed on Apr. 13, 2016 with the Japanese Patent Office, the disclosures of which are incorporated herein by reference in its entirety.

BACKGROUND

Field of the Disclosure

Embodiments of the present disclosure relate to the art of a vibration damper for suppressing torsional vibrations resulting from torque pulses by an inertia torque of a mass.

Discussion of the Related Art

JP-A-2008-164013 describes a damper device comprising a planetary gear unit. In the damper device taught by JP-A-2008-164013, torque is transmitted between a disk connected to an output shaft of an engine and a plate connected to an input shaft of a transmission through a spring. In the planetary gear unit, a carrier is connected to the disk to serve as an input element, a ring gear is connected to the plate to serve as an output element, and a sun gear is connected to an inertia member to serve as an inertial mass.

In the damper device taught by JP-A-2008-164013, the sun gear serving as the inertial mass is oscillated relative to the ring gear by pulsation of an input torque. In this situation, surfaces of a tooth of the sun gear come into contact repeatedly with both adjacent teeth of a pinion gear engaged therewith while generating rattling noise and vibrations. Such rattling noise and vibrations may be suppressed by increasing the numbers of teeth the sun gear and the pinion gears or increasing the number of the pinion gears thereby increasing tooth contact ratio between the sun gear and the pinion gear. However, if the numbers of teeth of the sun gear and the pinion gears or the number of the pinion gears is/are increased, contact points between the teeth of the sun gear and the pinion gears are increased and hence the rattling noise may be increased. Especially, when the frequency of the torque pulse resonates with the natural frequency of the gears, such rattling noise and vibrations may be further increased.

SUMMARY

Aspects of the present disclosure have been conceived noting the foregoing technical problems, and it is therefore an object of the present disclosure is to suppress rattling noise and vibrations in the planetary gear unit of a torsional vibration damper.

The embodiments of the present disclosure relate to a torsional vibration damper comprising: a planetary gear unit including three rotary elements such as a ring gear, a sun gear, and a carrier; and a plurality of pinion gears interposed between the ring gear and the sun gear while being supported by the carrier in a rotatable manner. One of the rotary elements serves as an input element, another one of the rotary elements serves as an output element, and still another one of the rotary elements serves as an inertial element that is oscillated to establish an inertial torque by a relative rotation between the input element and the output element within a predetermined range. The inertial element is oscillated to establish an inertial torque by a relative rotation between the input element and the output element within a predetermined range. The pinion gears are interposed between the sun gear and the ring gear at predetermined intervals, and gear dimensions of one of the pinion gears and gear dimensions of another one of the pinion gears are different from each other. Modules of the sun gear and the ring gear within an oscillation range of said one of the pinion gears are identical to that of said one of the pinion gears, and modules of the sun gear and the ring gear within an oscillation range of said another one of the pinion gears are identical to that of said another one of the pinion gears.

In a non-limiting embodiment, the gear dimensions may include the module, backlash and number of teeth.

In a non-limiting embodiment, the ring gear, the sun gear and the pinion gears may individually include a helical gear, and the pinion gears may be disposed on a predetermined circle around a rotational center axis of the sun gear at predetermined intervals.

Thus, according to the embodiments of the present application, the gear dimensions of one of the pinion gears and gear dimensions of another one of the pinion gears are differentiated from each other. According to the embodiment of the present disclosure, therefore, the timing of tooth contact of one of pinion gears with the sun gear and the ring gear, and the timing of tooth contact of another one of pinion gears with the sun gear and the ring gear are differentiated from each other. For this reason, resonance of the rattling noises and the vibrations resulting from tooth contact can be prevented.

In addition, since the pinion gears are arranged around the sun gear at regular intervals, an axial moment in the planetary gear unit may be balanced even if the gear specifications are differentiated.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 6 is a table showing the numbers of teeth and working pressure angle of gears of the planetary gear unit according to still another embodiment.

DETAILED DESCRIPTION OF THE PREFERRED EMBODIMENT(S)

Figure 1:
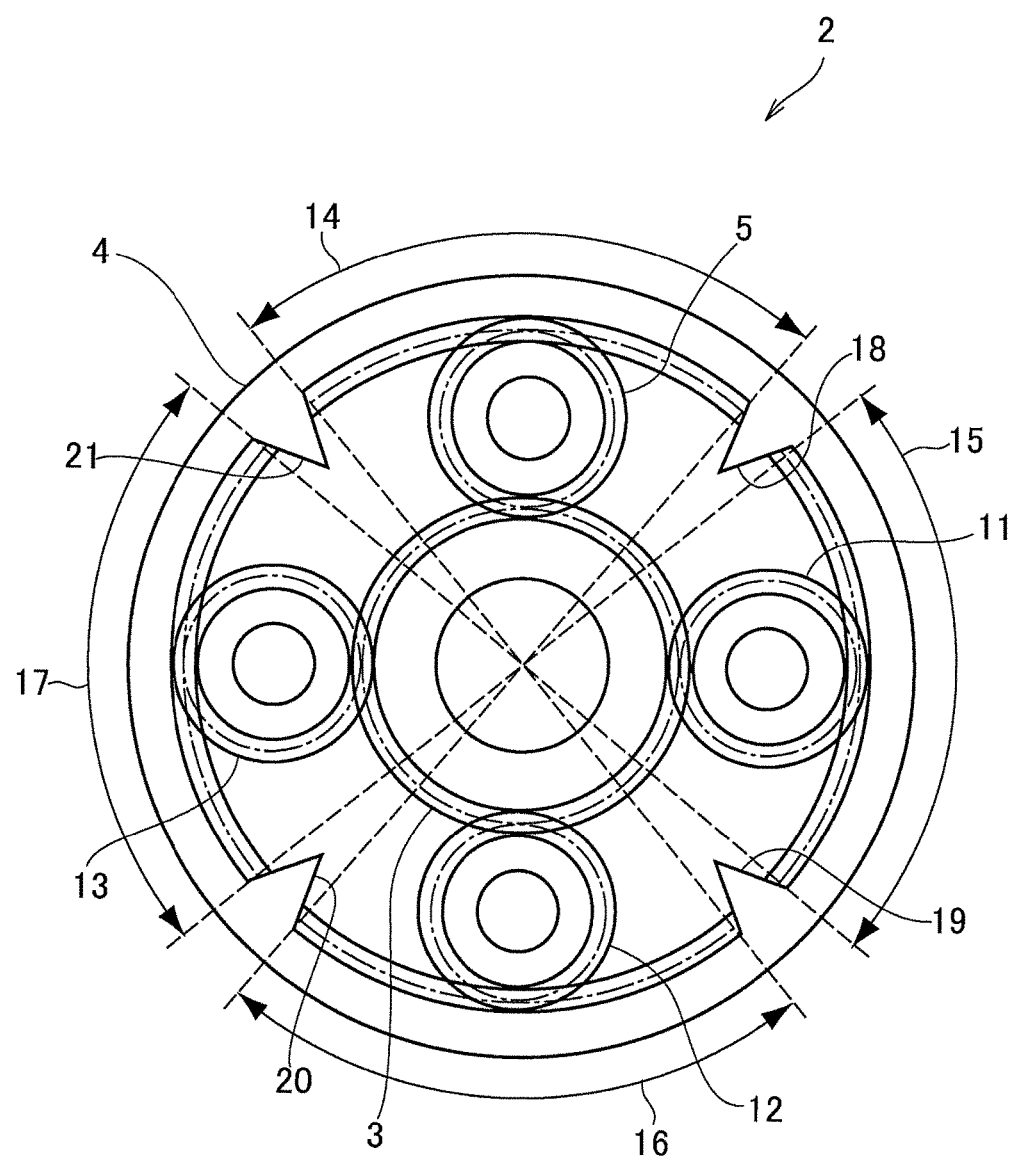
FIG. 1 is a front view showing the planetary gear unit of the torsional vibration damper according to the preferred embodiment.

Embodiments of the torsional vibration damper according to the present disclosure will now be explained with reference to the accompanying drawings. Turning now to FIG. 1, there is shown a preferred embodiment of a single-pinion planetary gear unit 2 of the torsional vibration damper 1. The planetary gear unit 2 is adapted to perform a differential action among rotary elements. As illustrated in FIG. 1, the planetary gear unit 2 comprises: a sun gear 3 serving as in inertial element; a ring gear 4 that is arranged concentrically with the sun gear 3; a plurality of pinion gears P (5, 11, 12, 13) interposed between the sun gear 3 and the ring gear 4; and a carrier 11 supporting the pinion gears P in a rotatable manner. Optionally, a double-pinion planetary gear unit may also be used as the planetary unit 2 according to need.

Figures 2, 3:
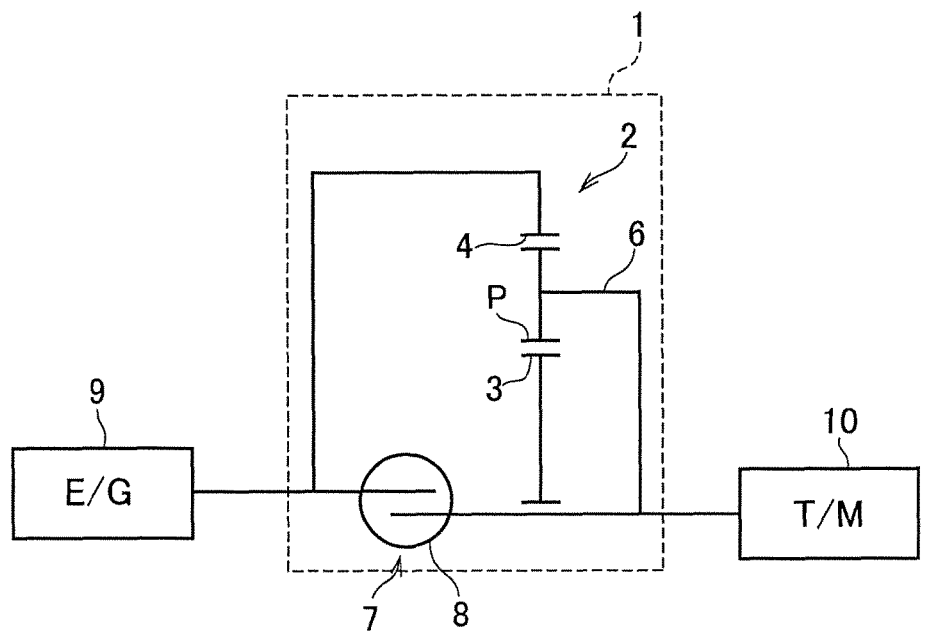
FIG. 2 is a schematic illustration showing the torsional vibration damper arranged in a powertrain of a vehicle.
FIG. 3 is a table showing the numbers of teeth and modules of gears of the planetary gear unit shown in FIG. 1 in each segment.

Turning to FIG. 2, there is shown an example of the torsional vibration damper 1 having the planetary gear unit 2 arranged in a powertrain of a vehicle. In the example shown in FIG. 2, specifically, the ring gear 4 serves as an input element, and the carrier 6 serves as an output element. The ring gear 4 is connected to the carrier 6 through a spring damper 7 having springs 8. In the example shown in FIG. 2, therefore, the ring gear 4 and the carrier 6 are allowed to rotate relatively with each other within a predetermined angle governed by a structure of the spring damper 7, and an elastic force of the spring damper 7 counteracts to a torque applied to the ring gear 4. The ring gear 4 is also connected to a prime mover (e.g., an internal combustion engine) 9, and the carrier 6 is also connected to a driven member 10 such as a transmission.

Turning back to FIG. 1, according to the preferred embodiment, a first projection 18, a second projection 19, a third projection 20, and a fourth projection 21 are formed on an inner circumference of the ring gear 4 at regular intervals in such a manner as to protrude inwardly so that the ring gear 4 is divided into four segments. As described, the pinion gears P includes a first pinion gear 5, a second pinion gear 11, a third pinion gear 12, and a fourth pinion gear 13, and gear dimensions, specifically, the numbers of teeth of the pinion gears 5, 11, 12, and 13 are different from one another.

Specifically, the first pinion gear 5 is interposed between the sun gear 3 and the ring gear 4 within the first segment 14 between the fourth projection 21 and the first projection 18, the second pinion gear 11 is interposed between the sun gear 3 and the ring gear 4 within the second segment 15 between the first projection 18 and the second projection 19, the third pinion gear 12 is interposed between the sun gear 3 and the ring gear 4 within the third segment 16 between the second projection 19 and the third projection 20, and the fourth pinion gear 13 is interposed between the sun gear 3 and the ring gear 4 within the fourth segment 17 between the third projection 20 and the fourth projection 21. In addition, the numbers of teeth of the sun gear 3 and the ring gear 4 are differentiated in each segment 14, 15, 16, and 17.

Thus, each pinion gear 5, 11, 12 and 13 is individually prevented from entering into the adjacent segment by the projections 18, 19, 20, and 21. In addition, since the first projection 18, the second projection 19, the third projection 20, and the fourth projection 21 are formed on the inner circumference of the ring gear 4 at regular intervals, circumferential length of the first segment 14, the second segment 15, the third segment 16 and the fourth segment 17 are identical to one another.

The numbers of teeth and modules of the sun gear 3, the ring gear 4 and the pinion gears 5, 11, 12 and 13 in each segment 14, 15, 16, and 17 are indicated in FIG. 3. As can be seen from FIG. 3, a ratio between the numbers of teeth of the sun gear 3 and the pinion gear P and a ratio between the numbers of teeth of the ring gear 4 and the pinion gear P are identical to each other in each segment 14, 15, 16, and 17. That is, the module of the pinion gear P is identical to those of the sun gear 3 and the rig gear 4 in each segment 14, 15, 16, and 17.

The module of each gear can be calculated by dividing the pitch diameter by the number of teeth: $m=d/z$; where "m" is the module, "d" is the pitch diameter, and "z" is the number of teeth. Since the numbers of teeth of the sun gear 3, the pinion gear P, and the ring gear 4 are differentiated in each of the segment 14, 15, 16, and 17, values of the modules of the sun gear 3, the pinion gear P, and the ring gear 4 are different in each of the segment 14, 15, 16, and 17.

According to the preferred embodiment, given that the modules of the sun gear 3, the first pinion gear 5, and the ring gear 4 within the first segment 14 are "1", the modules of the sun gear 3, the second pinion gear 11, and the ring gear 4 within the second segment 15 are "4/5", the modules of the sun gear 3, the third pinion gear 12, and the ring gear 4 within the third segment 16 are "2/3", and the modules of the sun gear 3, the fourth pinion gear 13, and the ring gear 4 within the fourth segment 17 are "5/9".

When a torque of the prime mover 9 is applied to the ring gear 4, the carrier 6 is subjected to a reaction of the torque rotating the driven member 10. Consequently, the ring gear 4 and the carrier 6 are rotated relatively to each other while compressing the springs 8 in accordance with the compressing load. In this situation, the pinion gears 5, 11, 12 and 13 are individually rotated within a predetermined range, and the sun gear 3 is rotated in accordance with an angle of a relative rotation between the ring gear 4 and the carrier 6. If the torque of the prime mover 9 applied to the ring gear 4 is stable, the planetary gear unit 2 is rotated integrally to deliver the torque to the driven member 10.

The compression force (i.e., a torsional force) is changed by pulsation of the torque applied to the ring gear 4 thereby causing a relative rotation between the ring gear 4 and the carrier 6. Since such relative rotation between the ring gear 4 and the carrier 6 is caused by the torque pulse, an angle of the relative rotation between the ring gear 4 and the carrier 6 is rather small. In this situation, therefore, the pinion gears 5, 11, 12 and 13 are individually oscillated only within a predetermined angle.

In this situation, if timings of tooth contact between the sun gear 3 and all of the pinion gears 5, 11, 12 and 13, and timings of tooth contact between the ring gear 4 and all of the pinion gears 5, 11, 12 and 13 are synchronized, rattling noise and vibrations may be resonated. In the planetary gear unit 2 according to the preferred embodiment, however, values of the modules of the sun gear 3, the pinion gear P and the ring gear 4 are differentiated in each of the segment 14, 15, 16, and 17. According to the preferred embodiment, therefore, the timing of tooth contact between the sun gear 3 and the pinion gear P and the timing of tooth contact between ring gear 4 and the pinion gear P are differentiated in each of the segment 14, 15, 16, and 17.

For example, it is possible to reduce synchronous frequency of the timings of tooth contacts between the sun gear 3 and the first pinion gear 5 and between the ring gear 4 and the first pinion gear 5, with the timings of tooth contacts between the sun gear 3 and the other pinion gear and between the ring gear 4 and the other pinion gear. In other words, the timing of occurrence of the tooth contacts is differentiated in each of the segment 14, 15, 16, and 17. For this reason, resonance of the rattling noises and the vibrations resulting from tooth contact can be prevented.

The resonance of the rattling noises and the vibrations resulting from tooth contact may also be prevented by differentiating frequency of the rattling noises or the vibrations in at least one of the segments, instead of differentiating the module of the gears. For example, the frequency of the rattling noises or the vibrations may be differentiated in each of the segment by differentiating a diameter of the base circle, the addendum circle, the root circle or the like of each gear to differentiate a pitch circle diameter of each of the gear.

Figures 4, 5:
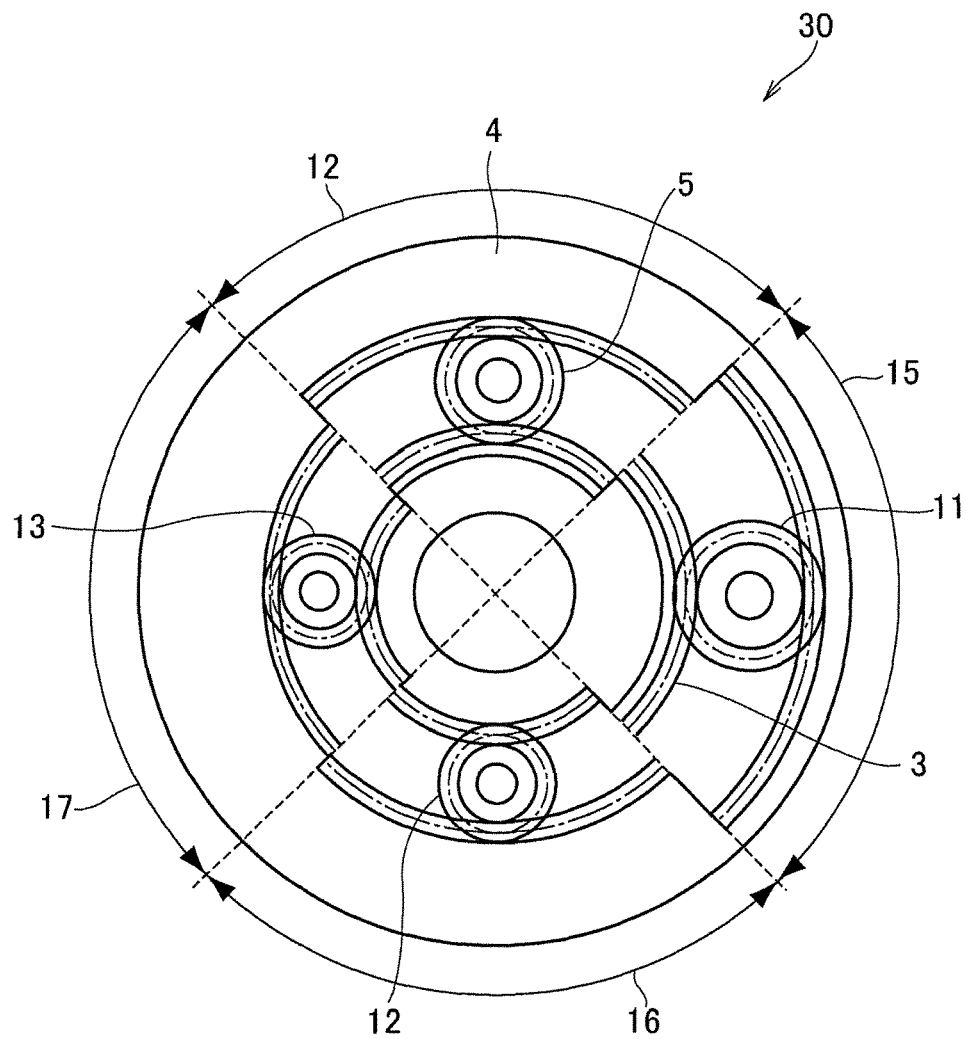
FIG. 4 is a front view showing a modification embodiment of the planetary gear unit.
FIG. 5 is a table showing the numbers of teeth and modules of gears of the planetary gear unit shown in FIG. 4 in each segment.

Turning to FIGS. 4 and 5, there is shown a modification embodiment of the planetary gear unit in which the pitch circle diameters of each of the gear is differentiated in each of the segment so as to equalize the modules of the gears in each of the segment. In FIG. 4, common reference numerals are allotted to the element in common with those in FIG. 1, and detailed explanations for the common elements will be omitted. In the planetary gear unit 30 shown in FIG. 4, specifically, the numbers of teeth of the sun gear 3, the ring gear 4 the first pinion gear 5, the second pinion gear 11, the third pinion gear 12, and the fourth pinion gear 13 are identical to those of the example shown in FIG. 1. In order to equalize the modules of the sun gear 3, the ring gear 4 and the pinion gears 5, 11, 12 and 13 in each of the segment 14, 15, 16, and 17, the pitch circle diameters of the sun gear 3, the planetary gear P, and the ring gear 4 are differentiated in each of the segment 14, 15, 16, and 17.

In the planetary gear unit 30, the numbers of teeth of the first pinion gear 5, the second pinion gear 11, the third pinion gear 12, and the fourth pinion gear 13 meshed with the sun gear 3 and the ring gear 4 during oscillation within a predetermined degree are different from one another in each of the segment 14, 15, 16, and 17. That is, meshing frequencies of the first pinion gear 5, the second pinion gear 11, the third pinion gear 12, and the fourth pinion gear 13 with the sun gear 3 and the ring gear 4 are different from one another in each of the segment 14, 15, 16, and 17. In other words, the timing of occurrence of the tooth contact is different in each of the segment 14, 15, 16, and 17. For this reason, resonance of the rattling noises and the vibrations resulting from tooth contact can be prevented.

Here will be explained still another embodiment of the present disclosure with reference to FIG. 6. According to still another embodiment, working pressure angles of each of the gear is differentiated in each of the segment to prevent resonance of the rattling noises and the vibrations resulting from tooth contact. According to still another embodiment, specifically, the numbers of teeth of the sun gear 3, the ring gear 4 and the pinion gear P are identical to one another in each of the segment 14, 15, 16, and 17, but the working pressure angles of the sun gear 3, the ring gear 4 and the pinion gear P are differentiated from one another in each of the segment 14, 15, 16, and 17. That is, backlashes between the pinion gear P and the sun gear 3 and between the pinion gear P and the ring gear 4 are differentiated in each of the segment 14, 15, 16, and 17.

Specifically, the backlash is a gap between the face of the tooth of e.g., the ring gear 4 and the leading face of the tooth behind it on the pinion gear P driven by the ring gear 4. When the rotational direction of the pinion gear P is changed, tooth contact occurs between the ring gear 4 and the pinion gear P thereby generating rattling noises and vibrations. Same phenomenon occurs also between the pinion gear P and the sun gear 3. In order to differentiate frequencies of the rattling noises and the vibrations in each of the segment 14, 15, 16, and 17, according to still another embodiment, the working pressure angles of the sun gear 3, the ring gear 4 and the pinion gear P are differentiated from one another thereby changing backlashes between the pinion gear P and the sun gear 3 and between the pinion gear P and the ring gear 4 in each of the segment 14, 15, 16, and 17. For this reason, it is possible to reduce frequency of synchronization of the timings of tooth contacts between the sun gear 3 and the pinion gear P and between the ring gear 4 and the pinion gear P in the segments 14, 15, 16, and 17. According to still another embodiment, therefore, resonance of the rattling noises and the vibrations resulting from tooth contact can be prevented.

The backlash between the gears may also be changed by changing a circular tooth thickness, a start angle of involute curve, and a tooth depth. In addition, given that a helical gear is used as the gears of the planetary gear unit, the backlash between the gears may also be changed by changing a helix angle.

Although the above exemplary embodiments of the present application have been described, it will be understood by those skilled in the art that the present application should not be limited to the described exemplary embodiments, and various changes and modifications can be made within the spirit and scope of the present application.

For example, in the forgoing embodiments, the gear specifications are differentiated in each of the segment. However, the gear specifications in the geometrically opposed segments may be equalized. In this case, an axial moment may be balanced in the planetary gear unit.

What is claimed is:

1. A torsional vibration damper, comprising:
   a planetary gear unit including three rotary elements of a ring gear, a sun gear, and a carrier; and
   a plurality of pinion gears interposed between the ring gear and the sun gear while being supported by the carrier in a rotatable manner and being arranged in a circumferential direction of the sun gear or the ring gear, wherein
   one of the rotary elements serves as an input element, another one of the rotary elements serves as an output element, and still another one of the rotary elements serves as an inertial element that is oscillated to establish an inertial torque by a relative rotation between the input element and the output element within a predetermined range,
   the pinion gears mesh the sun gear and the ring gear at predetermined intervals,
   gear dimensions of one of the pinion gears and gear dimensions of another one of the pinion gears are different from each other,
   modules of the sun gear and the ring gear within an oscillation range of said one of the pinion gears are identical to that of said one of the pinion gears, and
   modules of the sun gear and the ring gear within an oscillation range of said another one of the pinion gears are identical to that of said another one of the pinion gears.

2. The torsional vibration damper as claimed in claim 1, wherein the gear dimensions include the module, backlash and number of teeth.

3. The torsional vibration damper as claimed in claim 1, wherein the ring gear, the sun gear and the pinion gears individually include a helical gear, and wherein the pinion gears are disposed on a predetermined circle around a rotational center axis of the sun gear at predetermined intervals.

4. The torsional vibration damper as claimed in claim 2, wherein the ring gear, the sun gear and the pinion gears individually include a helical gear, and wherein the pinion gears are disposed on a predetermined circle around a rotational center axis of the sun gear at predetermined intervals.

* * * * *